(12) United States Patent
Steinmetz et al.

(10) Patent No.: US 7,984,795 B2
(45) Date of Patent: Jul. 26, 2011

(54) KEYED CONTOUR BRAKING SYSTEM FOR A COMMERCIAL VEHICLE

(75) Inventors: Andreas Steinmetz, Gleishorbach (DE);
Bernward Redemann, Hockenheim (DE); Hellmut Jäger, Ludwigshafen / Rhein (DE)

(73) Assignee: WABCO Radbremsen GmbH, Mannheim (DE)

(*) Notice: Subject to any disclaimer, the term of this patent is extended or adjusted under 35 U.S.C. 154(b) by 1043 days.

(21) Appl. No.: 11/624,621

(22) Filed: Jan. 18, 2007

(65) Prior Publication Data

US 2007/0163847 A1 Jul. 19, 2007

(30) Foreign Application Priority Data

Jan. 18, 2006 (DE) .......................... 10 2006 002 442

(51) Int. Cl.
*F16D 65/00* (2006.01)

(52) U.S. Cl. .................. 188/73.1; 188/218 XL; 301/6.1

(58) Field of Classification Search .................. 188/73.1, 188/218 XL, 218 R, 250 F; 301/6.1, 6.8
See application file for complete search history.

(56) References Cited

U.S. PATENT DOCUMENTS

2006/0289256 A1 * 12/2006 Kloos et al. ............. 188/218 XL

FOREIGN PATENT DOCUMENTS

| DE | 20021587 U1 * | 5/2001 |
| DE | 10055859 A1 | 5/2002 |
| DE | 102004034565 A1 * | 2/2006 |
| DE | 102007047794 A1 * | 5/2009 |

* cited by examiner

*Primary Examiner* — Pam Rodriguez
(74) *Attorney, Agent, or Firm* — Schwabe, Williamson & Wyatt, P.C.

(57) ABSTRACT

Various embodiments of the invention relate to a vehicle, especially a commercial vehicle, with a braking system for a wheel of the vehicle having an axle arrangement and a brake, especially a disc brake, whereby the cross-section of the axle arrangement has an outer contour differing from a circle, and the brake has a brake carrier. According to one embodiment of the invention, the brake carrier has an opening whose inner contour differs from a circle and the outer contour lies on the axle arrangement such that the brake carrier surrounds the axle of the brake to form a keyed fit with the axle arrangement.

19 Claims, 8 Drawing Sheets

KEYED CONTOUR BRAKING SYSTEM FOR A COMMERCIAL VEHICLE

CROSS-REFERENCE TO RELATED APPLICATION

The present application claims International Priority under 35 U.S.C. §119 to co-pending German Patent Application No. 10 2006 002 442.7, filed Jan. 18, 2006, entitled "Fahrzeug, insbesondere Nutzfahrzeug," the entire contents and disclosure of which is hereby incorporated by reference in its entirety.

TECHNICAL FIELD

Embodiments of the present invention relate to a braking system for a wheel of a vehicle, especially a commercial vehicle. More specifically, a braking system having an axle arrangement and a brake, especially a disc brake, where a cross-section of the axle arrangement has a non-circular outer contour and the brake has a brake carrier with an opening having a non-circular inner contour keyed to fit with the axle arrangement.

BACKGROUND

Commercial vehicles often employ a braking system to guide the braking force generated by the brake into the axle arrangement and thereby into the vehicle. A flange is normally provided with various screw connections aligned in the direction of the brake axle or aligned peripherally around the axle. Frequently, such a flange is provided with an adapter that is between the axle arrangement and the actual brake. Depending on the installation position and/or the direction of rotation of the wheel, the screw connections are subject to various shearing forces or mechanically problematic tension. In addition, the overall construction of the braking system is very complex and involved, especially when an adapter is used.

SUMMARY OF INVENTION

Accordingly, one embodiment of the invention provides a braking apparatus and system that overcome the hereinaforementioned disadvantages of the heretofore-known braking devices of this general type and that includes a brake carrier having an opening whose inner contour deviates from a circle and lies on the outer contour of an axle arrangement such that the brake carrier surrounds an axle of a brake and is coupled according to a keyed fit. In other words, the braking force in one embodiment of the braking system is guided into the axle arrangement not via screw connections, but rather by means of the keyed fit of the brake carrier with the axle arrangement. As such, the screw connections that are normally subject to shearing force or tension may be altered/abandoned in various embodiments. In addition, an adapter may also be unnecessary to various embodiments of the invention. With the foregoing and other items in view, there is provided, in accordance with one embodiment of the invention, a vehicle with a braking system of the initially-cited type to improve the mechanical situation and simplify the overall design.

As mentioned herein, the "non-circular" nature of the outer contour of a cross-section of the axle arrangement does not have to apply to the entire axle arrangement. Instead, the description of non-circular contours may apply to an area in which the axle arrangement forms a keyed fit with the brake carrier. This area may be created by being molded on, shaped or reshaped. The area may also be (additionally) affixed.

Similarly, as mentioned herein, the "non-circular" nature of the inner contour of the opening of the brake carrier does not have to apply to the entire brake carrier, but may instead apply to an area in which the brake carrier forms a keyed fit with the axle arrangement. According to one embodiment of the invention, the inner contour of the opening may describe a closed structure surrounding the axle arrangement. Such a closed structure may create a particularly reliable connection between the brake carrier and the axle arrangement. In one embodiment, the brake carrier may be axially inserted onto the axle arrangement to mount.

According to one embodiment of the invention, the inner contour of the opening may alternately enclose an angle less than 360°. In other words, the inner contour is open in this case. In embodiments where the inner contour encloses the axle arrangement on three sides, the brake carrier does not need to be axially insert onto the axle arrangement to mount. Instead, the brake carrier may be mounted onto the axle arrangement radially.

In one embodiment, the inner contour of the opening defines a "C" or "U" shape, which is advantageous for production and/or installation and removal. According to one embodiment of the invention, the two legs of the "C" or "U" shape configured to enclose a sharp angle that is preferably about 0.2° to about 5°. This configuration may make mounting or coupling the brake carrier onto the axle arrangement easier, because there is minimal friction, if any, to be overcome.

According to one embodiment of the invention, a clamping device is provided to clamp the free ends of the inner contour of the opening onto the outer contour of the axle arrangement. This configuration may provide a particularly advantageous embodiment when the brake carrier is mounted and/or inserted onto the axle arrangement with extra play and/or give to make installation of the brake carrier easier. In this case, the clamping device may compensate for the extra give and/or play and still create the previously described keyed fit. Since the clamping counters the elastic return force of the brake carrier, the brake carrier is under tension when installed, which keeps vibrations or other mechanical influences from impairing the clamping device and/or the keyed fit between the brake carrier and axle arrangement while the brake is being used.

According to another embodiment of the invention, the inner contour of the opening fits in two or more angled positions around the axle of the brake on the outer contour of the axle arrangement. This gives the overall construction substantial flexibility in regard to the installation position of the brake which is very advantageous given the traditionally limited installation space.

According to one embodiment of the invention, at least one screw perpendicular to the brake axle may be provided to fasten the brake carrier to the axle arrangement. In contrast to the conventionally used screw connections, the screw guides a small amount of braking force, if any, into the axle arrangement. The braking force is largely or even completely guided via the keyed fit between the brake carrier and axle arrangement. As such, the screw serves to fasten the brake in an axial direction to the axle arrangement. In one embodiment of the invention, a first screw and at least one other screw may be provided that are perpendicular to the axle and are offset from each other in the direction of the axle. Accordingly, this configuration fixes the brake in an axial direction and may also secure it against tipping.

In addition or alternatively, one embodiment includes at least one contact surface, acting in the direction of the brake axle, provided on the axle arrangement to axially fix the brake carrier to the axle arrangement. According to one embodiment of the invention, the brake carrier may be alternatively or additionally welded to the axle arrangement.

In one embodiment, the outer contour of the axle arrangement is a shape selected from the group consisting of a square, a rectangle, a triangle, a parallelogram, a trapezoid, and/or an oval. The inner contour of the opening may also be square, rectangular, triangular, trapezoidal, oval, or the shape of a parallelogram.

According to one embodiment, the inner contour of the opening describes two squares rotatably offset from each other. Theoretically, this arrangement yields eight different possibilities for configurations to fix the brake to the axle arrangement.

The brake carrier is plate-shaped according to one embodiment of the invention. This embodiment provides a particularly advantageous configuration for potentially welding the brake carrier to the axle arrangement, because there are no projecting parts of the brake carrier to prevent welding.

One embodiment of the invention provides that no portion of the brake carrier projects/extends beyond the outer perimeter of the brake disc of the brake. With this embodiment, the brake carrier may not hold and guide a rim-side brake disc. Instead, the rim-side brake disk may be held and guided by the calipers. One advantage of this embodiment is that no part of the brake carrier interferes when welded to the axle arrangement.

However, in another embodiment of the invention, the brake carrier serves to hold and guide a braking-side brake pad of the brake and/or a pressure plate of the brake. In other words, in various embodiments, no other parts are necessary or provided beyond the brake carrier to hold and guide the braking-side brake pad and/or the pressure plate.

Yet another preferred embodiment of the invention provides a guide pin affixed to the brake carrier on which a sliding caliper of the brake is moveably mounted. In the case of commercial vehicles, at least two guide pins may be provided. This embodiment is particularly advantageous by ensuring that the sliding caliper moves smoothly in reference to the brake carrier.

According to one embodiment of the invention, a braking-side brake pad of the brake may be symmetrical to a clamping device, whereas a rim-side brake pad is offset perpendicular to the brake axle toward a disk exit side in the preferred direction of rotation. In other words, the caliper is "twisted" in this embodiment. As a result of this asymmetry, undesirable torque is at least partially compensated while braking to relieve the guide pin(s). This improves mobility and hence helps the brakes move more easily. In addition, the individual parts of the brake are subject to less stress which increases the service life of the brake.

In addition to the particular braking system described in detail above, one embodiment of the invention also concerns a braking system for various vehicles, such as a commercial vehicle. As previously indicated at least one feature of an embodiment of the invention also concerns a brake for such a vehicle braking system. In accordance with a concomitant feature of one embodiment of the invention, a brake carrier is provided for the described vehicle braking system.

BRIEF DESCRIPTION OF THE DRAWINGS

Other advantages and details of the braking system according to at least one embodiment of the invention and devices suitable for it are found in the following explanation with reference to the drawings.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Various operations may be described as multiple discrete operations and/or structures in turn, in a manner that may be helpful in understanding embodiments of the present invention; however, the order of description should not be construed to imply that these operations and/or structures are order dependent.

For the purposes of the described embodiments of the instant description, the phrase "A/B" means "A or B." For purposes of the described embodiments of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but it may. Furthermore, the terms "comprising," "including," "having," and the like, as used with respect to embodiments of the present invention, are synonymous.

As mentioned herein, the terms "non-circular" and/or "deviates from a circle" and the like, as used with respect to contours of the various embodiments of the present invention, are synonymous. They describe the nature of the contour and do not have to apply to the entire device. Instead, the description of non-circular contours may apply to an area in which the device forms a keyed fit with the other device. This area may be created by being molded on, shaped or reshaped. The area may also be (additionally) affixed. Among other shapes, exemplary non-circular contours may be square, rectangular, triangular, trapezoidal, oval, or the shape of a parallelogram.

Figure 1:
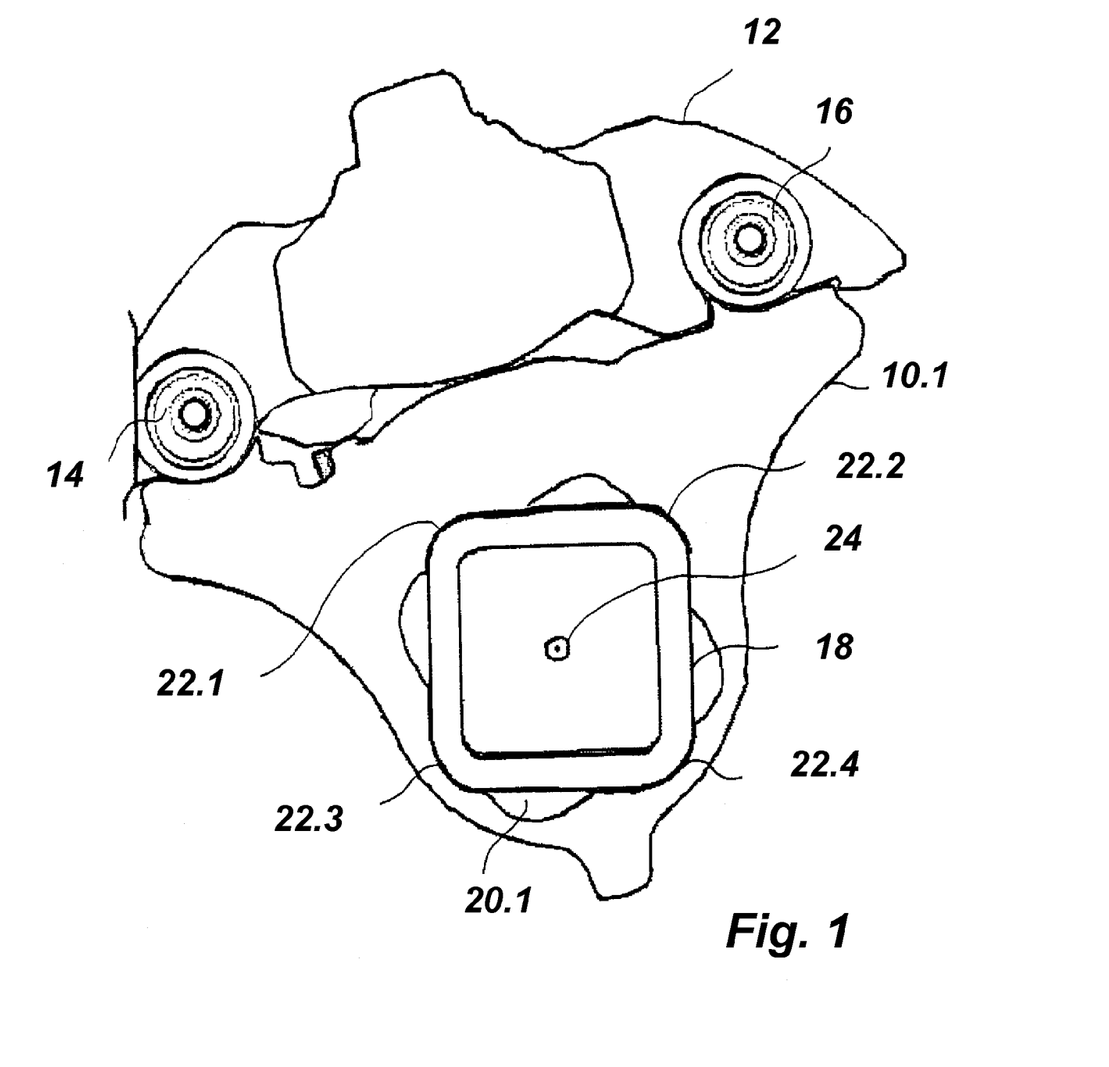
FIG. 1 illustrates an axial view of a first exemplary braking system in accordance with at least one embodiment of the invention.

Referring now to FIG. 1, a brake carrier 10.1, a sliding caliper 12 that may be shifted by means of guide pins 14 and 16 in reference to the brake carrier 10.1, and an axle arrangement 18 with a square cross-section are shown.

The axle arrangement 18 is seated in an opening 20.1 in the brake carrier 10.1. The contour of the opening 20.1 corresponds to two rotatably offset squares so that the brake carrier 10.1 may be affixed to the axle arrangement 18 in eight different angle positions.

Since the opening 20.1 of the brake carrier 10.1 is surrounded by a closed contour, the brake carrier 10.1 may be inserted axially onto the axle arrangement 18 to mount it. The brake carrier 10.1 then contacts the axle arrangement 18 in four areas 22.1 to 22.4. At the cited areas, the brake carrier 10.1 is welded, in one embodiment, to the axle arrangement 18 to fix it in an axial direction.

Since both the opening 20.1 of the brake carrier 10.1 and the axle arrangement 18 have a contour that deviates from a circle, the brake carrier 10.1 is coupled to the axle arrangement 18 with a keyed fit in regard to rotating on the axle 24 of the brake. The brake forces are guided from the brake carrier 10.1 into the axle arrangement 18 via this keyed fit while braking. In one embodiment, the brake carrier 10.1 is plate-shaped, and there are no projecting parts that could interfere with welding it to the axle arrangement 18.

Figure 2:
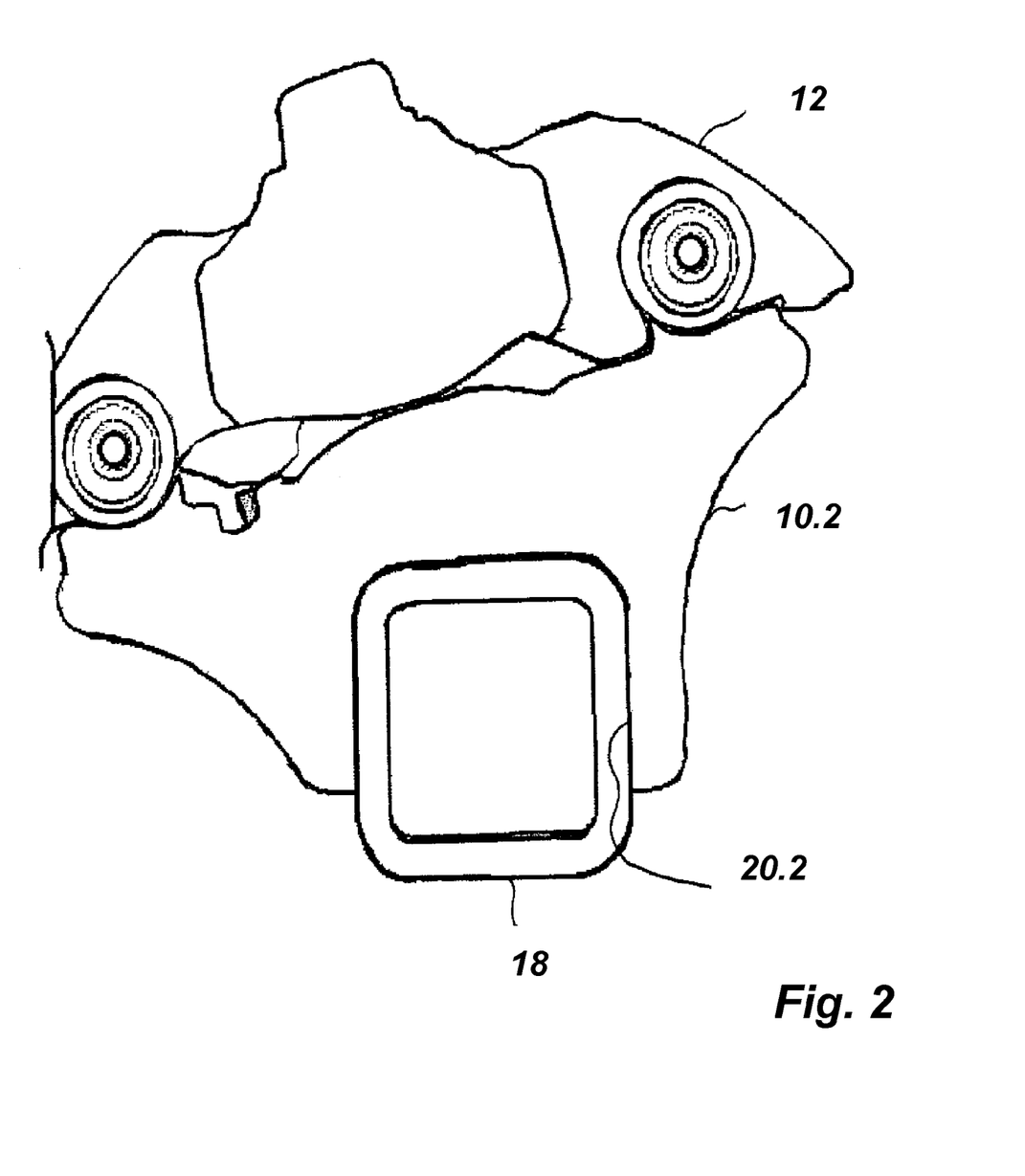
FIG. 2 illustrates a perspective view of a second exemplary braking system in accordance with at least one embodiment of the invention.

Referring now to FIG. 2, a perspective view of a second exemplary braking system in accordance with at least one embodiment of the invention is shown. The exemplary embodiment in FIG. 2 corresponds to the one in FIG. 1 apart from the following details:

Whereas the opening 20.1 in FIG. 1 is surrounded by closed contour, the opening 20.2 in FIG. 2 is surrounded by a U-shaped contour that is open. Hence the brake carrier 10.2 may be mounted radially on the axle arrangement 18. It does not have to be inserted on axially. Four different angled positions are possible in the illustrated embodiment of FIG. 2.

Figure 3:
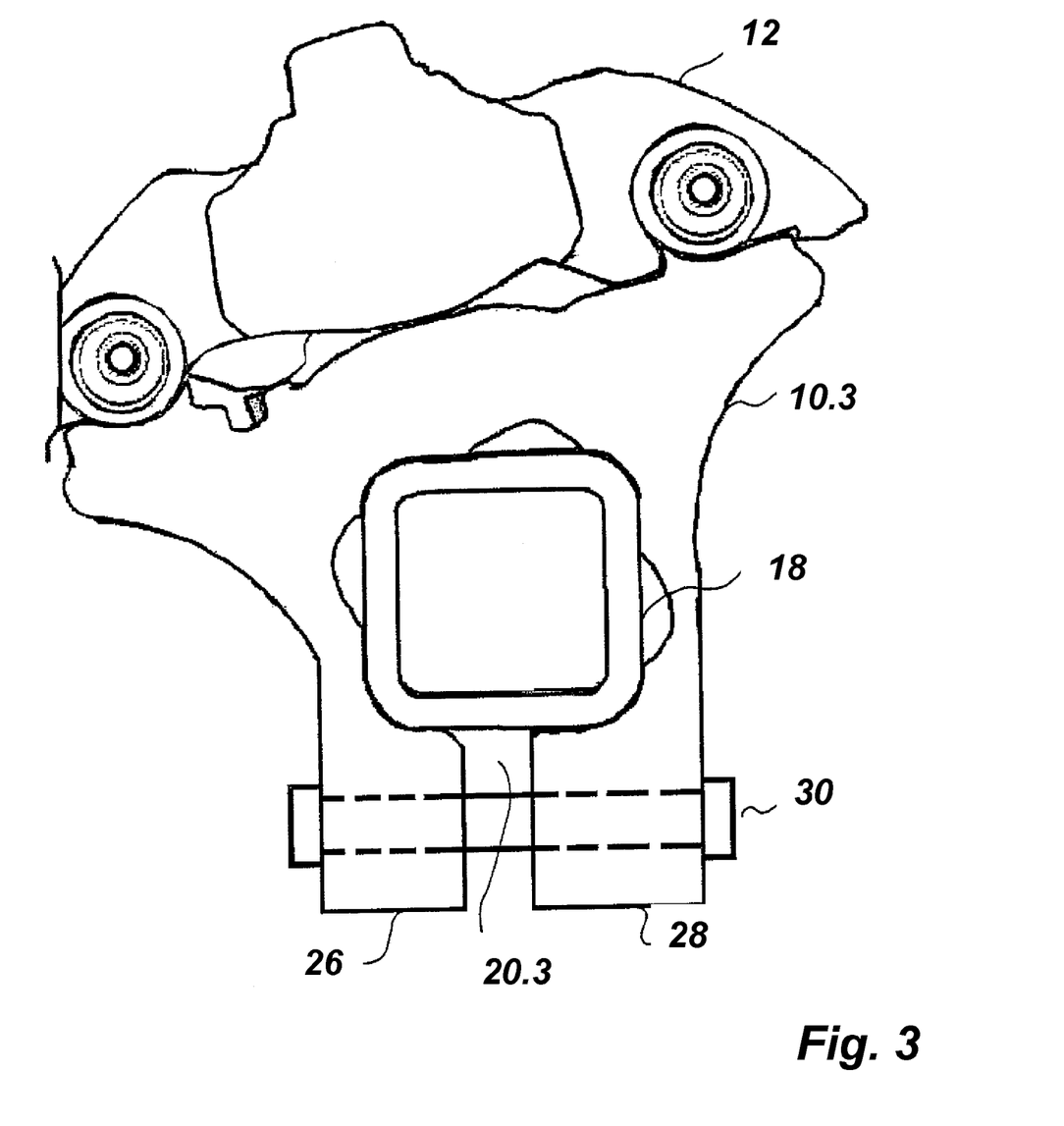
FIG. 3 illustrates an axial view of a third exemplary braking system in accordance with at least one embodiment of the invention.

Referring now to FIG. 3, an axial view of a third exemplary braking system in accordance with at least one embodiment of the invention is shown. The embodiment in FIG. 3 differs from that in FIG. 1 in that the opening 20.3 is not surrounded by a closed contour. Instead, it is formed by two legs 26 and 28 of the brake carrier 10.3. The two legs 26 and 28 are clamped onto the axle arrangement 18 by means of a schematically illustrated screw connection 30. This ensures that the brake carrier 10.3 reliably contacts the axle arrangement 18 even under a mechanical load such as vibration, etc. In addition to the clamping, welding may be provided as in FIG. 1.

Figure 4:
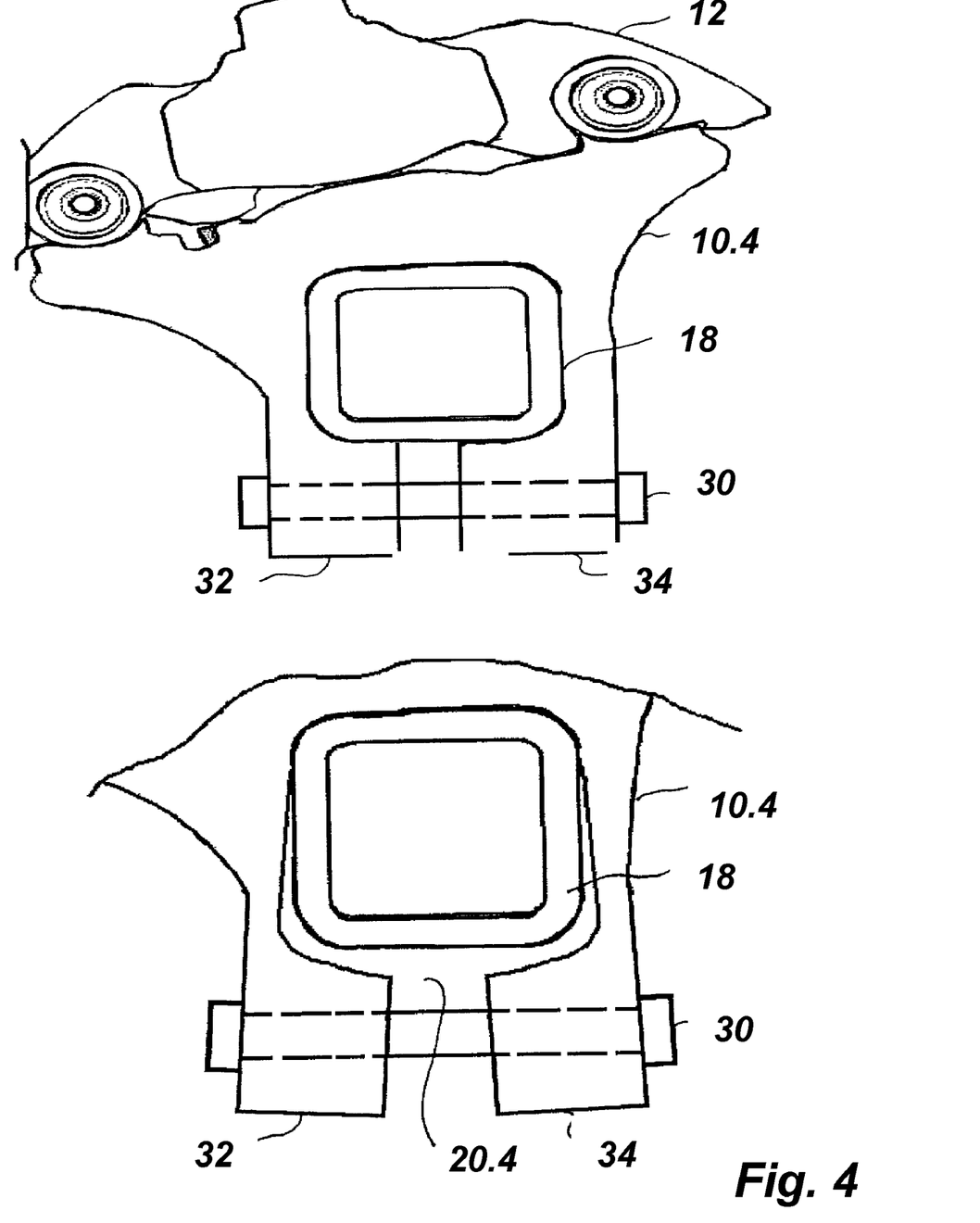
FIG. 4 illustrates perspective views of a fourth exemplary braking system in two operating states in accordance with at least one embodiment of the invention.

Referring now to FIG. 4, perspective views of a fourth exemplary braking system in two operating states in accordance with at least one embodiment of the invention is shown. The embodiment in FIG. 4 corresponds to that in FIG. 3 with the following differences:

On the one hand, the contour of the opening 20.4 does not correspond to that in FIG. 3 or FIG. 1. Instead, it allows four different angled positions of the brake carrier 10.4 in relation to the axle arrangement 18. In addition, the legs 32 and 34 of the brake carrier 10.4 are spread when unmounted (on the bottom in FIG. 4) which makes it easier to axially shove the brake carrier 10.4 onto the axle arrangement 18. The two legs 32 and 34 enclose a narrow angle such as about 5°. Tightening the screw connection 30 causes the brake carrier 10.4 to reliably contact the axle arrangement 18, and the screw connection 30 is clamped together. Welding may also be provided.

Figure 5:
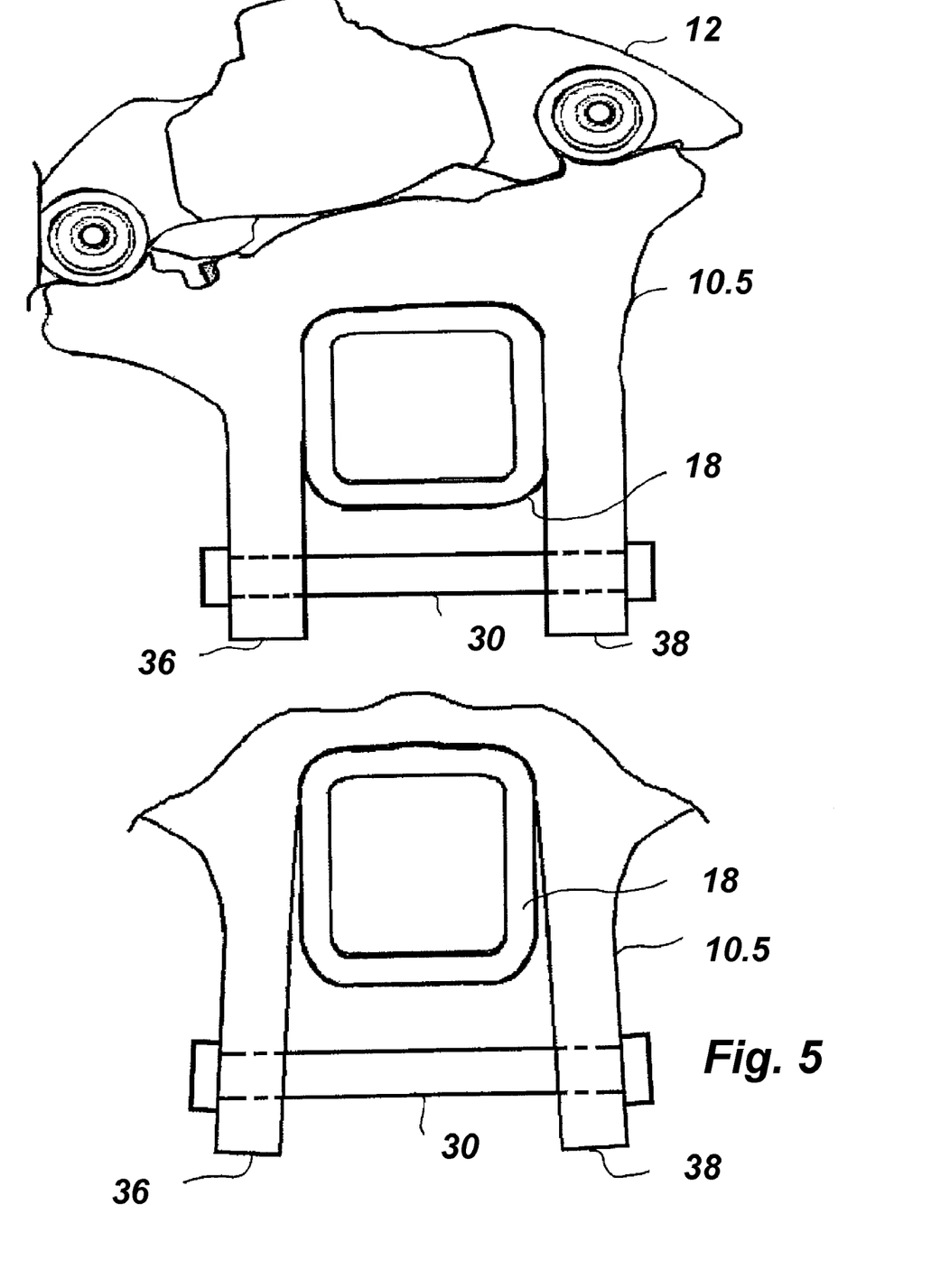
FIG. 5 illustrates perspective views as in FIG. 4, but of a fifth exemplary braking system in accordance with at least one embodiment of the invention.

Referring now to FIG. 5, perspective views are shown as in FIG. 4, but the views are of a fifth exemplary braking system in accordance with at least one embodiment of the invention. The embodiment in FIG. 5 differs slightly from that in FIG. 4 in that the two legs 36 and 38 of the brake carrier 10.5 do not grip around the axle arrangement 18 so that the brake carrier 10.5 does not have to be shoved axially onto the axle arrangement 18 and may be mounted from a radial direction.

Referring now to FIG. 6, a perspective view and two side views of a sixth exemplary braking system are shown in accordance with at least one embodiment of the invention. The embodiment in FIG. 6 corresponds to that previously shown in FIG. 2 with the following differences:

A projection 40 is formed on the axle arrangement 18, and said projection lies on the brake carrier 10.6 in an axial direction. This provides a first axial fixing means. Several projections of this kind may be provided to ensure fixation in both actual directions and possibly secure against tipping. They may be adapted to the manner in which the brake carrier is attached to the axle arrangement (radial or axial). The projections also provide a (temporarily) hold during welding to counteract material slippage during welding.

Figure 6A:
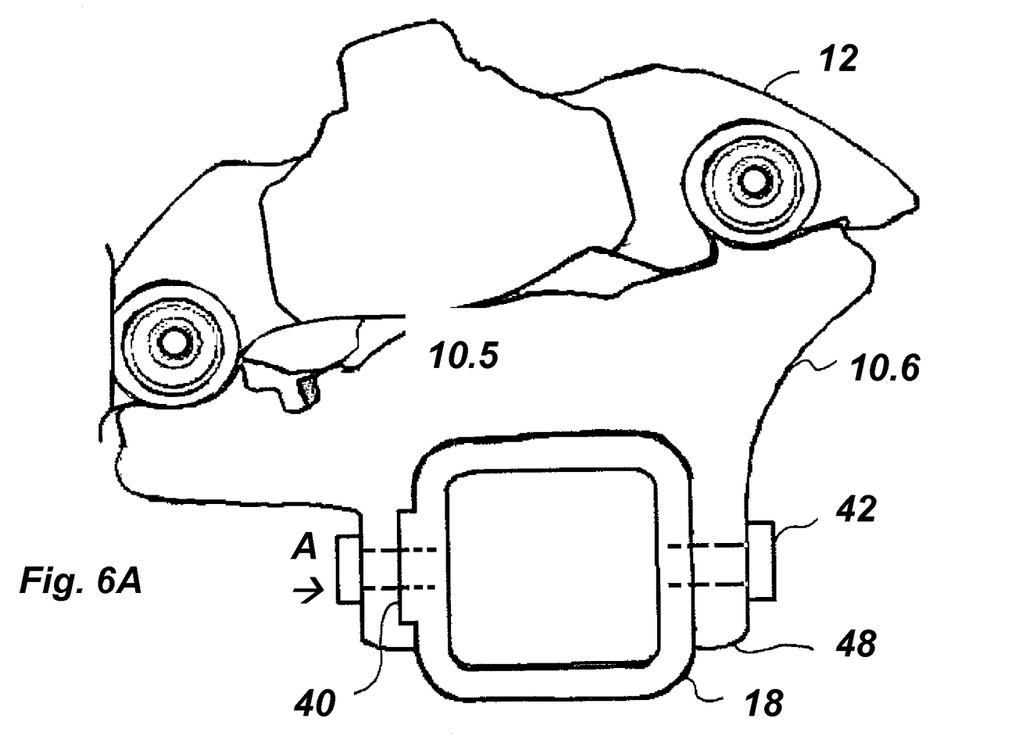
FIG. 6 illustrates a perspective view and two side views of a sixth exemplary braking system in accordance with at least one embodiment of the invention.
Figure 6B:
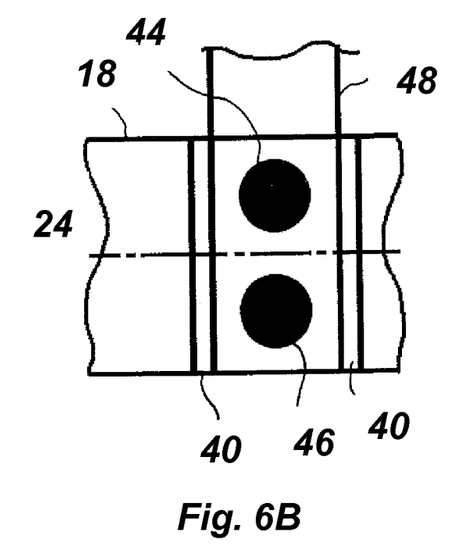

FIG. 6B shows a partial section of a screw connection 42 schematically indicated in FIG. 6A viewed in the direction of arrow A. Two screws 44 and 46 are provided that serve to fix the leg 48 of the brake carrier 10.6 on the axle arrangement 18. They counteract tipping, but they are not provided to guide braking force into the axle arrangement 18. This is exclusively enabled by the keyed fit of the brake carrier 10.6 with the axle arrangement 18.

Figure 6C:
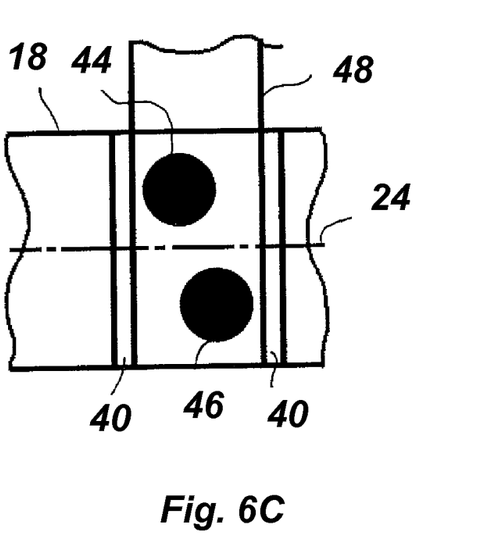

FIG. 6C shows an alternative to FIG. 6B in which the two screw connections 44 and 46 do not lie in a common axial plane but are rather arranged sequentially in an axial direction. This further counteracts tipping. The brake carrier legs in the embodiments in FIGS. 2, 3 and 6 may enclose a narrow angle when unmounted (see FIGS. 4 and 5).

Figure 7:
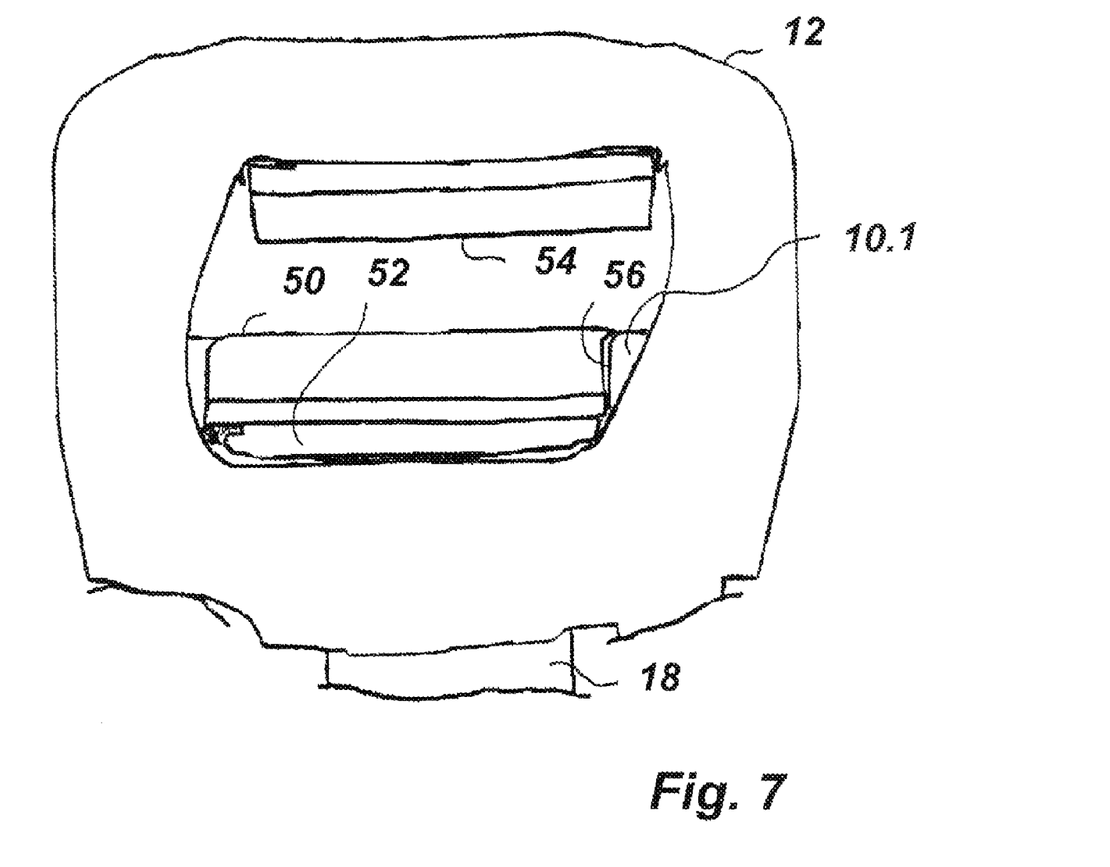
FIG. 7 illustrates a plan view of the braking system from FIG. 1 including installed brake pads and pressure plate in accordance with at least one embodiment of the invention.

Referring now to FIG. 7, a plan view of the braking system from FIG. 1 is shown, including installed brake pads and pressure plate in accordance with at least one embodiment of the invention. FIG. 7 shows an inner, i.e., braking-side brake pad 50 and pressure plate 52 and an outer, i.e., rim-side brake pad 54 that are offset from each other. The caliper 12 is also correspondingly asymmetrical. In particular, the braking-side brake pad 50 in the portrayed embodiment is symmetrical with a clamping device (not shown), whereas the rim-side brake pad 54 is offset toward the disk exit side. The caliper 12 is correspondingly "twisted." This at least partially compensates for undesired torque by relieving the guide pins 14 and 16. This improves the mobility and increases the ease with which the brake moves. In addition, the individual parts of the brake are subject to less stress which increases the service life of the brake. The brake pad 50 is held and guided by a contact surface 56 on the brake carrier 10.1.

Figure 8:
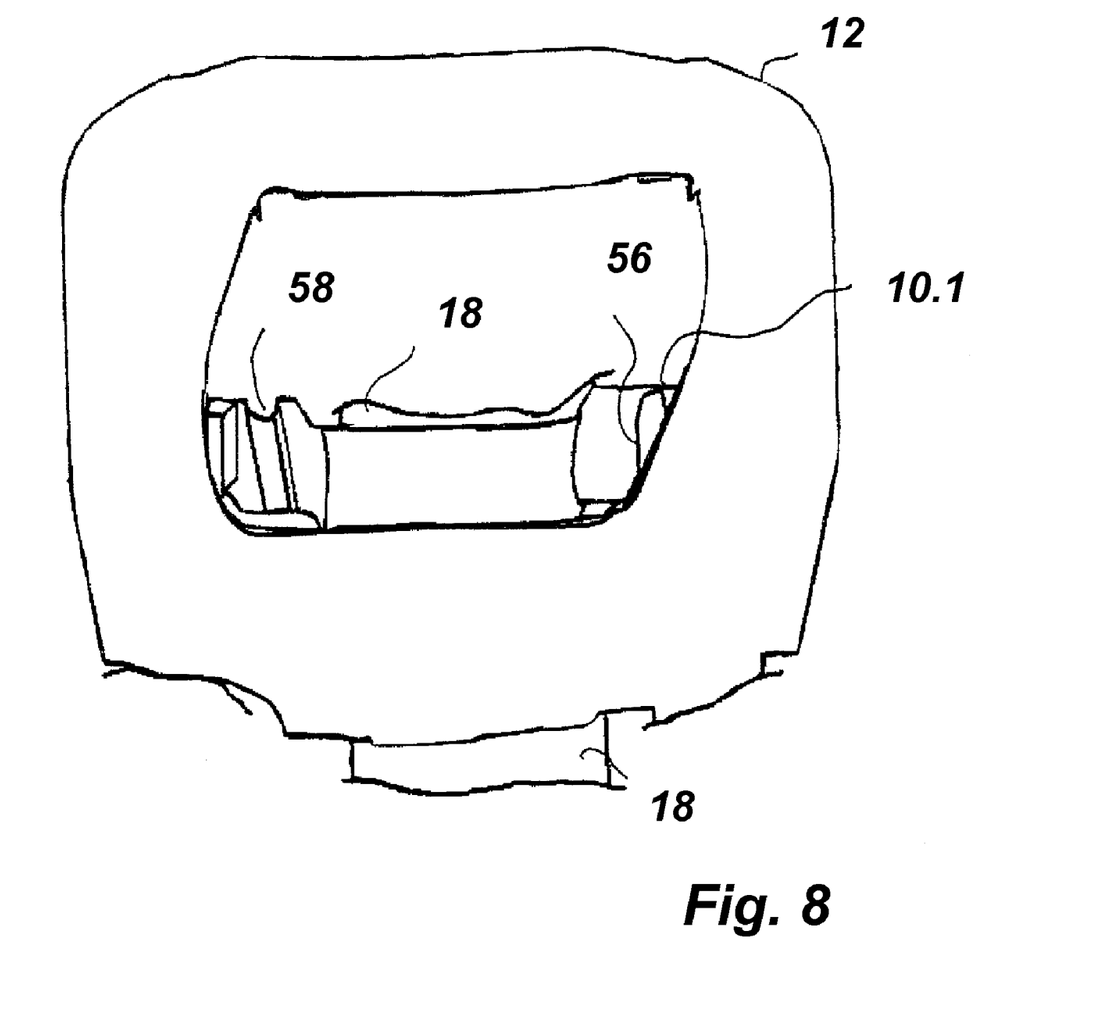
FIG. 8 shows the same plan view as in FIG. 7, but without the brake pads and pressure plate in accordance with at least one embodiment of the invention.

Referring now to FIG. 8, the same plan view as in FIG. 7 is shown, but without the brake pads 50 and pressure plate 52 in accordance with at least one embodiment of the invention. FIG. 8 reveals a groove 58 used to hold and guide the pressure plate 52 at an angle to the brake disc entrance. Other devices may be provided on the brake carrier 10 to hold or receive sensors and/or their leads.

The features of the invention disclosed in the above description, claims and drawing may be useful to the realization of the various embodiments of the invention either by themselves or in any combination.

What is claimed is:

1. A braking system, comprising:
an axle arrangement having a cross-section with an outer contour that differs from a circle; and
a brake, coupled to the axle arrangement, having a brake carrier with an opening having a non-circular inner contour on the outer contour of the axle arrangement such that the brake carrier surrounds the axle of the brake to form a keyed fit with the axle arrangement, wherein
the brake carrier is plate-shaped, and a brake pad is held and guided by a contact surface on the brake carrier.

2. The braking system according to claim 1, wherein the inner contour of the opening provides a closed structure around the axle arrangement.

3. The braking system according to claim 1, wherein the inner contour of the opening encloses the axle arrangement at an angle less than 360°.

4. The braking system according to claim 3, wherein the inner contour of the opening is shaped like a "C" or "U".

5. The braking system according to claim 4, wherein the two legs of the "C" or "U" enclose a sharp angle of preferably about 0.2° to about 5°.

6. The braking system according to claim 1, wherein the inner contour of the opening fits in two or more angled positions around the axle of the brake on the outer contour of the axle arrangement.

7. The braking system according to claim 1, wherein at least one contact surface on the axle arrangement acting in the direction of the axle of the brake is configured to axially fix the brake carrier on the axle arrangement.

8. The braking system according to claim 1, further comprising at least one screw lying perpendicular to the axle of the brake to fasten the brake carrier on the axle arrangement.

9. The braking system according to claim 8, wherein a first screw and at least one other screw, perpendicular to the axle of the brake, are offset from each other in the direction of the axle.

10. The braking system according to claim 1, wherein the brake carrier is welded to the axle arrangement.

11. The braking system according to claim 1, wherein the outer contour of the axle arrangement is a shape selected from the group consisting of a square, a rectangle, a triangle, a parallelogram, a trapezoid, and an oval.

12. The braking system according to claim 1, wherein the inner contour of the opening is a shape selected from the group consisting of a square, a rectangle, a triangle, a parallelogram, a trapezoid, and an oval.

13. The braking system according to claim 1, wherein the inner contour of the opening includes at least two rotatably offset squares.

14. The braking system according to claim 1, wherein no part of the brake carrier projects beyond the outer perimeter of a brake disc of the brake.

15. The braking system according to claim 1, wherein the brake carrier is configured to hold and to guide a braking-side brake pad of the brake and/or a pressure plate of the brake.

16. The braking system according to claim 1, further comprising a clamping device to clamp the free ends of the inner contour of the opening to the outer contour of the axle arrangement.

17. The braking system according to claim 16, further comprising a braking-side brake pad symmetrical with the clamping device and a rim-side brake pad offset perpendicular to the axle of the brake in the direction of a disk exit side in the preferred direction of rotation.

18. The braking system according to claim 1, further comprising a guide pin affixed to the brake carrier and movably mounted to a sliding caliper of the brake.

19. A vehicle, comprising:
at least one wheel; and
a braking system, coupled to the at least one wheel, having an axle arrangement and a brake, the axle arrangement having a non-circular outer contour cross-section and the brake having a brake carrier, defining a non-circular inner contour opening, and lying on the outer contour of the axle arrangement such that the brake carrier surrounds the axle of the brake to form a keyed fit with the axle arrangement, wherein
the brake carrier is plate-shaped, and a brake pad is held and guided by a contact surface on the brake carrier.

* * * * *